(12) United States Patent
Kim

(10) Patent No.: US 7,088,651 B2
(45) Date of Patent: Aug. 8, 2006

(54) METHOD AND APPARATUS FOR DETECTING LAND PRE-PIT ADDRESS INFORMATION RECORDED ON OPTICAL DISC

(75) Inventor: Myung-sik Kim, Suwon-si (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 621 days.

(21) Appl. No.: 10/259,835

(22) Filed: Sep. 30, 2002

(65) Prior Publication Data

US 2003/0123350 A1    Jul. 3, 2003

(30) Foreign Application Priority Data

Dec. 4, 2001    (KR) ............................... 2001-76234

(51) Int. Cl.
*G11B 15/52*    (2006.01)
(52) U.S. Cl. .................... 369/47.22; 369/53.34
(58) Field of Classification Search .................. None
See application file for complete search history.

(56) References Cited

U.S. PATENT DOCUMENTS 6,029,208 A    2/2000  Kim
6,088,307 A    7/2000  Fushimi et al.
6,091,682 A *  7/2000  Hikima ...................... 369/47.2
6,341,110 B1 * 1/2002  Tawaragi .................... 369/47.2

FOREIGN PATENT DOCUMENTS

| JP | 10-289521 A | 10/1998 |
| KR | 1994-0003555 B1 | 4/1994 |
| KR | 2001-0084663 A | 9/2001 |

* cited by examiner

*Primary Examiner*—Paul W. Huber
(74) *Attorney, Agent, or Firm*—Sughrue Mion, PLLC

(57) ABSTRACT

An apparatus and a method for detecting address information are provided. The apparatus for detecting address information from an optical disc on which a plurality of sectors are arranged and pre-pit data are recorded on each sector, includes: a window generation circuit for generating a detection window for detecting the pre-pit data; a data detection circuit for detecting the pre-pit data based on the generated detection window; a latch for latching the data detected by the data detection circuit to a larger number of bits than a pre-allotted number of bits; a synch information extraction circuit for generating synch information informing a time to refer to the latched data; and an address information extraction circuit for detecting address information by reading the latched data based on the generated synch information. Therefore, the address information recorded on an optical recording medium as land pre-pit (LPP) data can be efficiently detected.

11 Claims, 13 Drawing Sheets

LAND  GROOVE

LAND

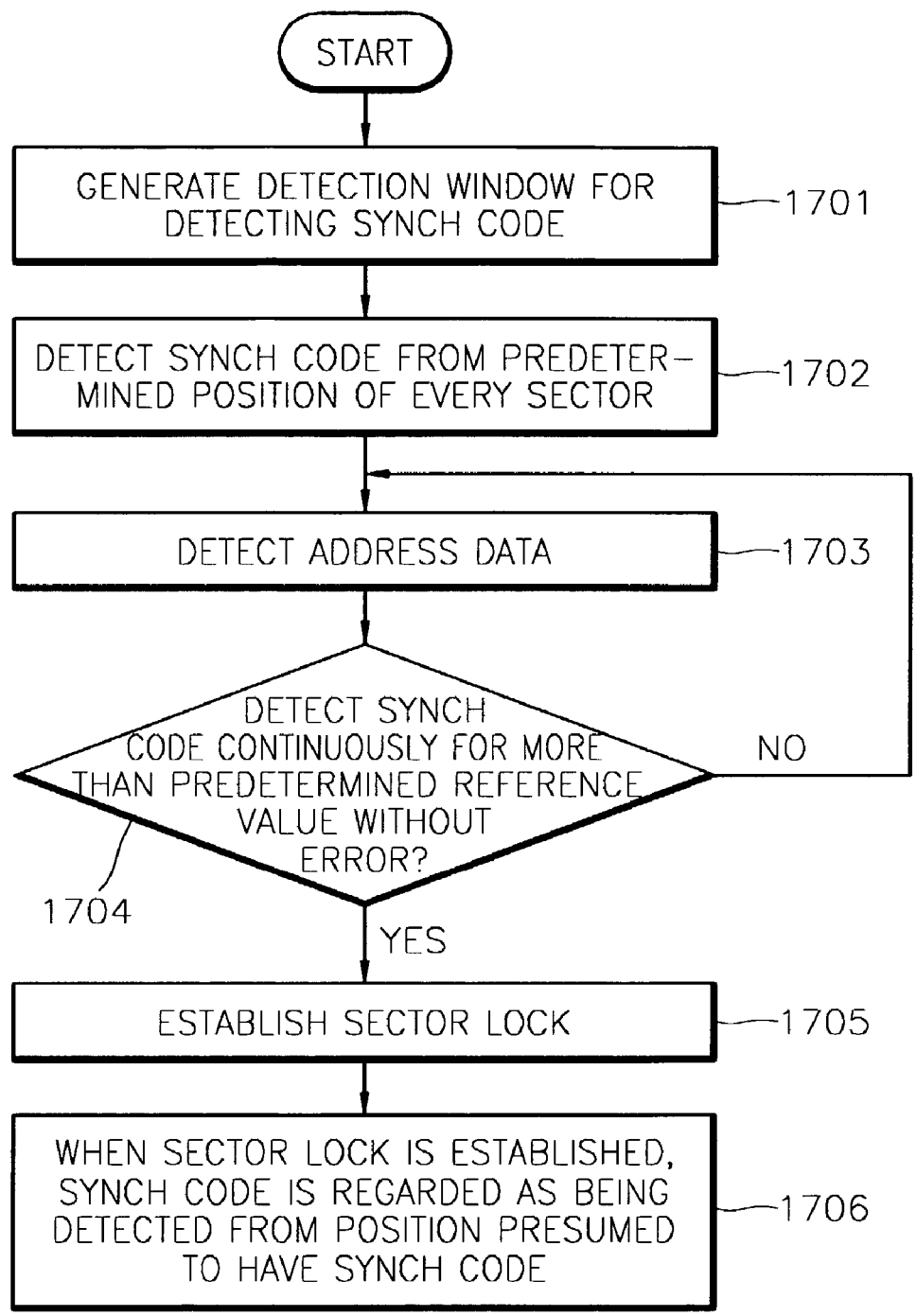

METHOD AND APPARATUS FOR DETECTING LAND PRE-PIT ADDRESS INFORMATION RECORDED ON OPTICAL DISC

CROSS-REFERENCE TO RELATED APPLICATIONS

This application is based upon and claims priority from Korean Patent Application No. 01-76234 filed Dec. 4, 2001, the contents of which are incorporated herein by reference.

BACKGROUND OF THE INVENTION

1. Field of the Invention

The present invention relates to an optical recording medium, and more particularly, to a method and an apparatus for detecting land pre-pit address information recorded on an optical recording medium having wobble tracks.

2. Description of the Related Art

Recordable optical discs, such as DVD-R, DVD-RAM, DVD+RW, and DVD-RW, have a spiral track on which wobble signals are recorded. In the case of a DVD-RAM, user data is recorded on land tracks and groove tracks and address information is recorded on a separate header region. However, in the case of a DVD-RW/+RW, specific user data is recorded on groove tracks only and address information is recorded on land pre-pits. Here, the address information recorded on the land pre-pits is referred to as land pre-pit (LPP) data. LPP data is recorded in a mastering process to report a physical address on a disc to which a pickup is transferred in a recording process of user data.

According to a DVD-RW specification, even and odd positions are alternately arranged on land tracks for each frame in order to record LPP data. Generally, the LPP data is recorded on the even positions which are located at a period of two frames. However, when the LPP data has been recorded on an adjacent position of a neighboring track, the LPP data is recorded on a next odd position. A synch code for LPP data is designated by three bits, such as 111 for an even position and 110 for an odd position. Here, in the case of an address data, 101 is referred to as 1 and 100 is referred to as 0.

According to the DVD-RW specification, it is difficult to precisely detect LPP data, because the recording position of the LPP data is determined in a mastering process. However, the precise detection of the LPP data is one of the important elements for determining the quality of a recording apparatus. Therefore, the LPP data has to be precisely detected in order to efficiently perform a recording process of user data on a DVD-RW.

SUMMARY OF THE INVENTION

To solve the above-described problems, it is an object of the present invention to provide a method and an apparatus to efficiently detect address information recorded on land pre-pits (LPP).

It is another object of the present invention to provide a method and an apparatus to efficiently detect synch in detecting the address information recorded on LPP.

In one aspect, the present invention provides an apparatus for detecting address information from an optical disc on which a plurality of sectors are arranged and pre-pit data are recorded on each sector, the apparatus comprising: a window generation circuit for generating a detection window for detecting the pre-pit data; a data detection circuit for detecting the pre-pit data based on the generated detection window; a latch for latching the data detected by the data detection circuit to a larger number of bits than a pre-allotted number of bits; a synch information extraction circuit for generating synch information informing a time to refer to the latched data; and an address information extraction circuit for detecting address information by reading the latched data based on the generated synch information.

It is preferable that the window generation circuit generates the detection window by counting wobble clocks at a period of phase locked loop (PLL) wobbles, which are obtained by binarizing wobble signals recorded on the optical disc. More preferably, the data detection circuit detects the pre-pit data at a time or position set by the detection window. More preferably, the pre-pit data are land pre-pit (LPP) data recorded on land tracks, the LPP data are formed of synch codes and address data, and the latch latches the detected data including the LPP data to a larger number of bits than the number of bits allotted in the synch codes.

Preferably, the synch information extraction circuit further includes: a counter for reporting the start and end of a frame and the start and end of the sector according to the position checked by the synch code detection circuit; and a decoder for supplying synch information that reports a time for the address information extraction circuit to take the LPP data from the latch based on information supplied from the counter. In this case, the counter includes: a wobble counter increased by one for every one PLL wobble at a period of two frames; and an LPP counter increased by one for every two frames at a period of one sector. Preferably, the wobble counter and the LPP counter are reset to zero when the synch code detection circuit detects an even position, and the wobble counter and the LPP counter are reset to a medium value and zero, respectively, when the synch code detection circuit detects an odd position.

In another aspect, the present invention provides an apparatus for detecting address information from an optical disc on which a plurality of sectors are arranged and pre-pit data are recorded on each sector, the apparatus comprising: a window generation circuit for generating an LPP detection window by counting wobble clocks at a period of PLL wobbles, which are obtained by binarizing wobble signals recorded on the optical disc; a data detection circuit for detecting data at a time or position set by the detection window; a latch for latching the detected data to a larger number of bits than a pre-allotted number of bits; a lock decision circuit for generating timing information informing a time for taking the latched data and examining the latched data to generate lock decision information about the re-generation of the LPP detection window or the extraction of address information based on the examination result; and an address information extraction circuit for detecting the address information by reading the latched data based on the generated timing information.

In the address information detecting apparatus, it is preferable that the LPP data includes synch codes, and the latch latches data to a larger number of bits than the number of bits allotted in the synch codes.

The lock decision circuit establishes a position lock if address data are continuously detected from the LPP detection window for more than a predetermined reference value after the synch code is detected, and the address information extraction circuit regards the address data detected outside the LPP detection window as errors when the position lock is established.

The lock decision circuit establishes a position unlock if address data are not continuously detected in the LPP detection window for more than a predetermined reference value after the synch code is detected, and the window generation circuit re-generates an LPP detection window when the position unlock is established.

The lock decision circuit establishes a sector lock if synch codes are continuously detected for more than a predetermined reference value. When the sector lock is established, even if a synch code detection circuit and the address information extraction circuit fail to detect synch codes at a position presumed to have the synch codes, the synch code detection circuit decides that the synch codes are detected.

In another aspect, the present invention provides a method for detecting address information from an optical disc on which a plurality of sectors are arranged and the address information is recorded on pre-pit on each sector, the method comprising: (a) latching data having a larger number of bits than a pre-allotted number of bits; and (b) examining the latched data in every sector to detect synch codes.

In the address information detecting method, preferably, (b) includes: (b1) delaying data at a first position in every sector, having a predetermined number of bits and being latched in the latch, until data at a second position in every sector, having a predetermined number of bits and being latched in the latch, is taken; and (b2) examining the synch code of the latched data from the second position and the synch code of the latched data from the first position to check a position on which address data is recorded.

Alternatively, the present invention provides a method for detecting address information from an optical disc on which a plurality of sectors are arranged and the address information formed of synch codes and address data is recorded on pre-pit on each sector, the method comprising: (a) generating a detection window for detecting a synch code; (b) detecting the synch code from a predetermined position in every sector; (c) establishing a position lock if address data are continuously detected from the detection window for more than a predetermined reference value after the synch code is detected; and (d) regarding data detected in outside the detection window as errors when the position lock is established.

Alternatively, the present invention provides a method for detecting address information from an optical disc on which a plurality of sectors are arranged and the address information formed of synch codes and address data is recorded on pre-pit on each sector, the method comprising: (a) generating a detection window for detecting a synch code; (b) detecting the synch code from a predetermined position in every sector; (c) establishing a position unlock if address data are not continuously detected in the detection window for more than a predetermined reference value after the synch code is detected; and (d) re-generating a detection window when the position unlock is established.

The present invention also provides a method for detecting address information from an optical disc on which a plurality of sectors are arranged and the address information formed of synch codes and address data is recorded on pre-pit on each sector, the method comprising: (a) generating a detection window for detecting a synch code; (b) detecting the synch code from a predetermined position in every sector; (c) establishing a sector lock if synch codes are detected without error for more than a predetermined reference value; and (d) deciding that the synch code is detected even if the synch code is not detected from a position presumed to have the synch code, when the sector lock is established.

BRIEF DESCRIPTION OF THE DRAWINGS

The above objectives and advantages of the present invention will become more apparent by describing in detail preferred embodiments thereof with reference to the attached drawings in which:

FIGS. 14 through 17 are flowcharts for explaining a method for detecting address information according to first through fourth embodiments of the present invention.

DETAILED DESCRIPTION OF THE INVENTION

Figure 1:
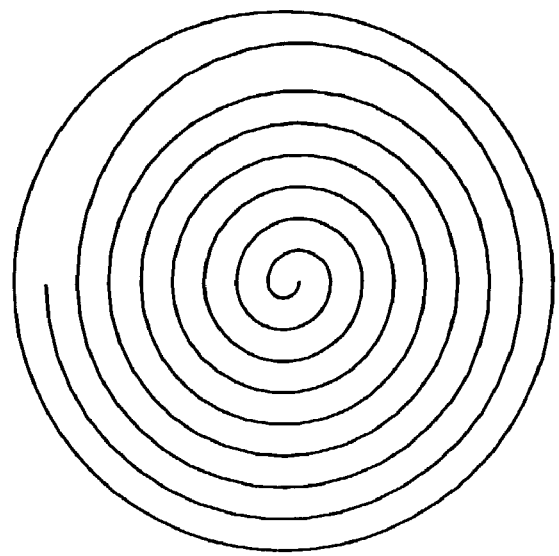
FIGS. 1 and 2 are reference views illustrating a recordable optical disc.
Figure 2:
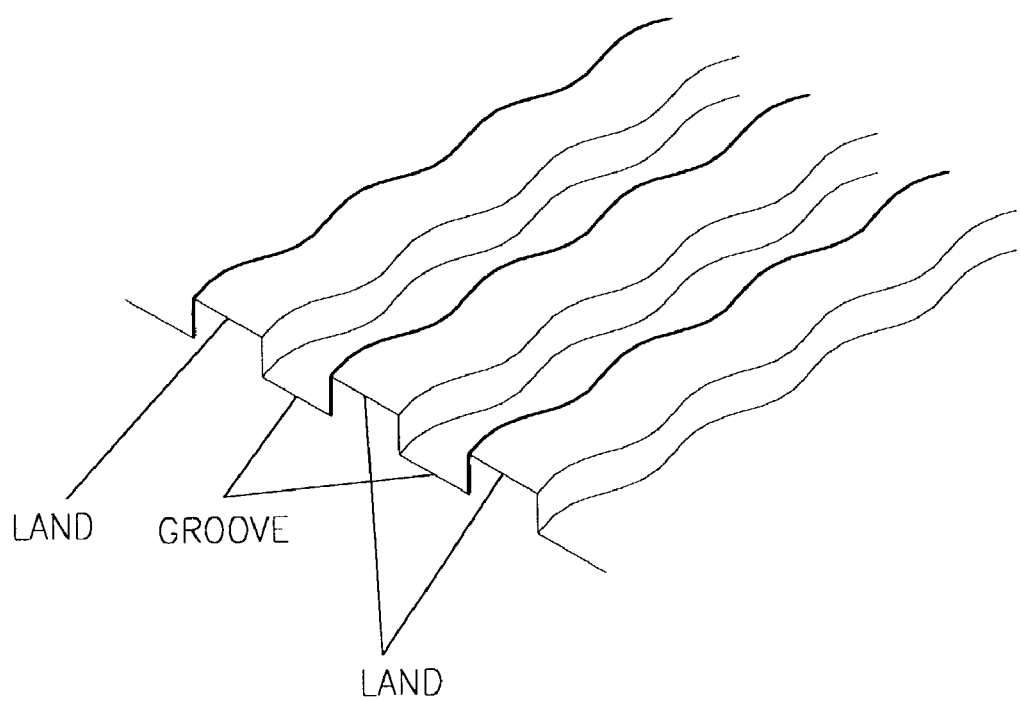

FIGS. 1 and 2 are reference views illustrating a recordable optical disc.

Referring to FIG. 1, a recordable optical disc includes a spiral track. Referring to FIG. 2, wobble signals are recorded on the track which is divided into land tracks and groove tracks. Here, user data is recorded on groove tracks only and address information is recorded on land pre-pits. Here, the address information recorded on the land pre-pits is referred to as land pre-pit (LPP) data. LPP data is recorded in a mastering process in order to report a physical address on a disc to which a pickup is to be transferred.

Figure 3:
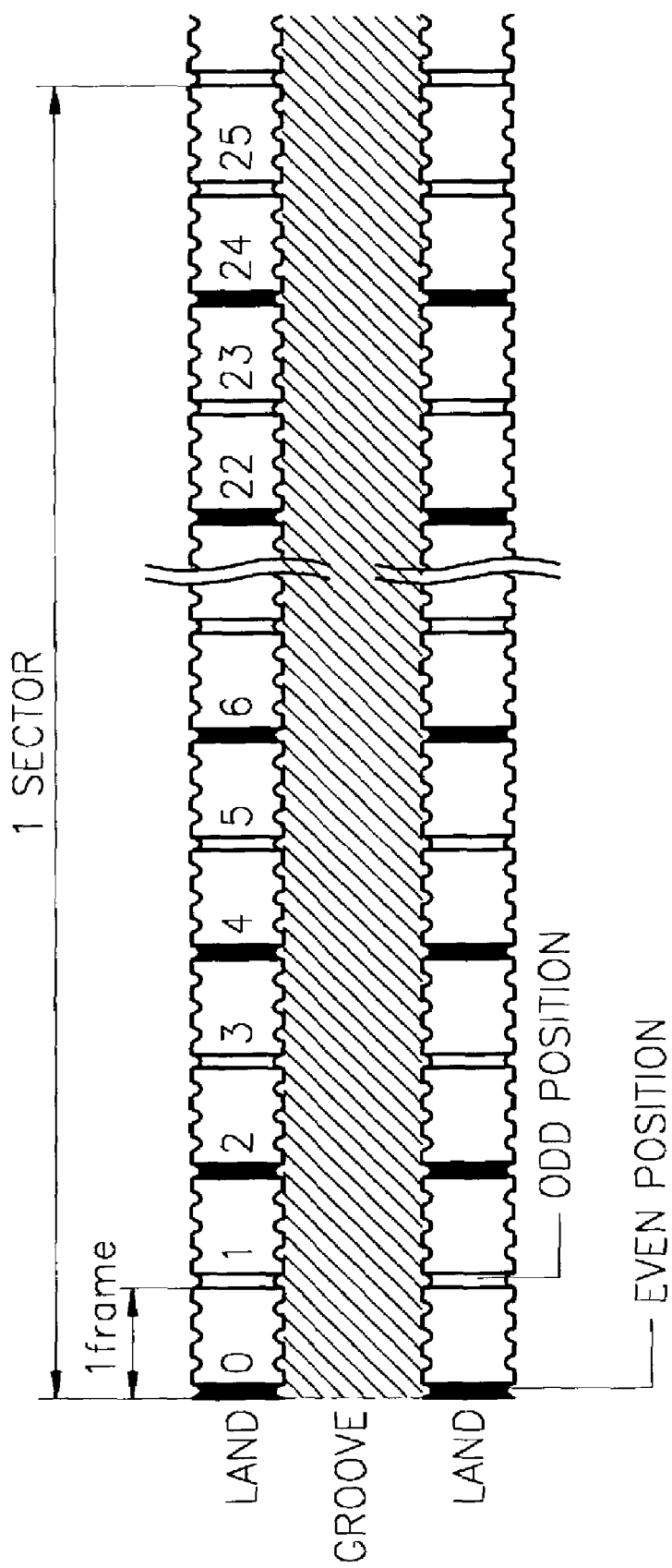
FIGS. 3 through 5 are reference views illustrating a method of recording land pre-pit (LPP) data.
Figure 4:
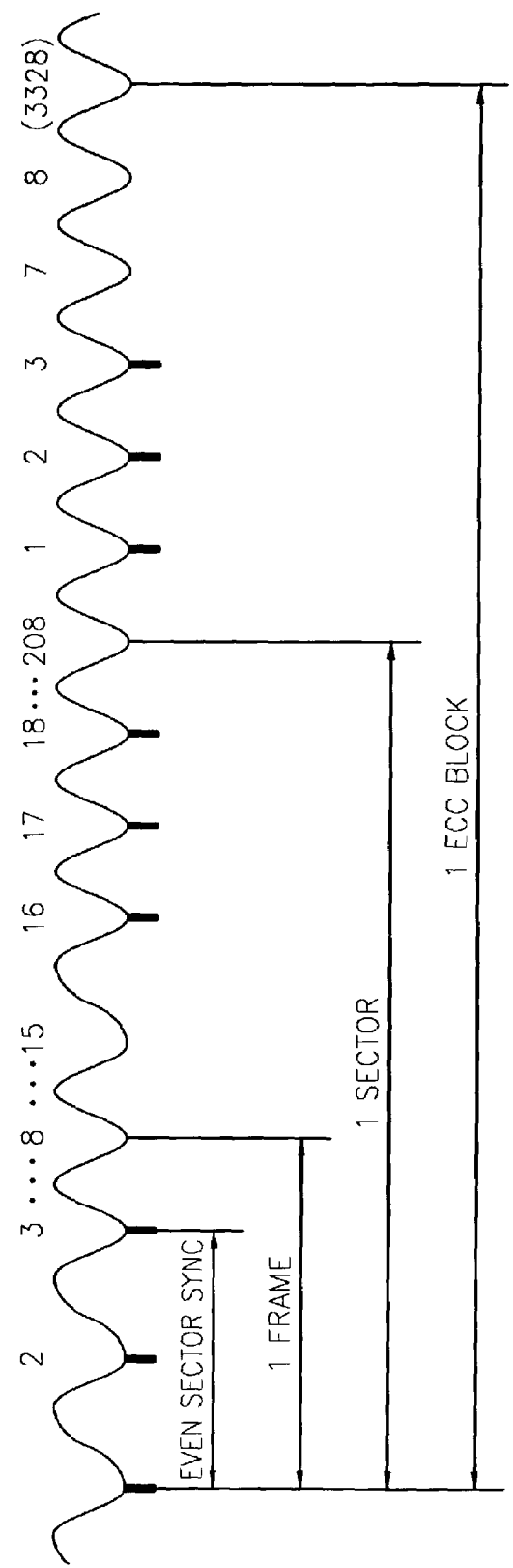
Figure 5:
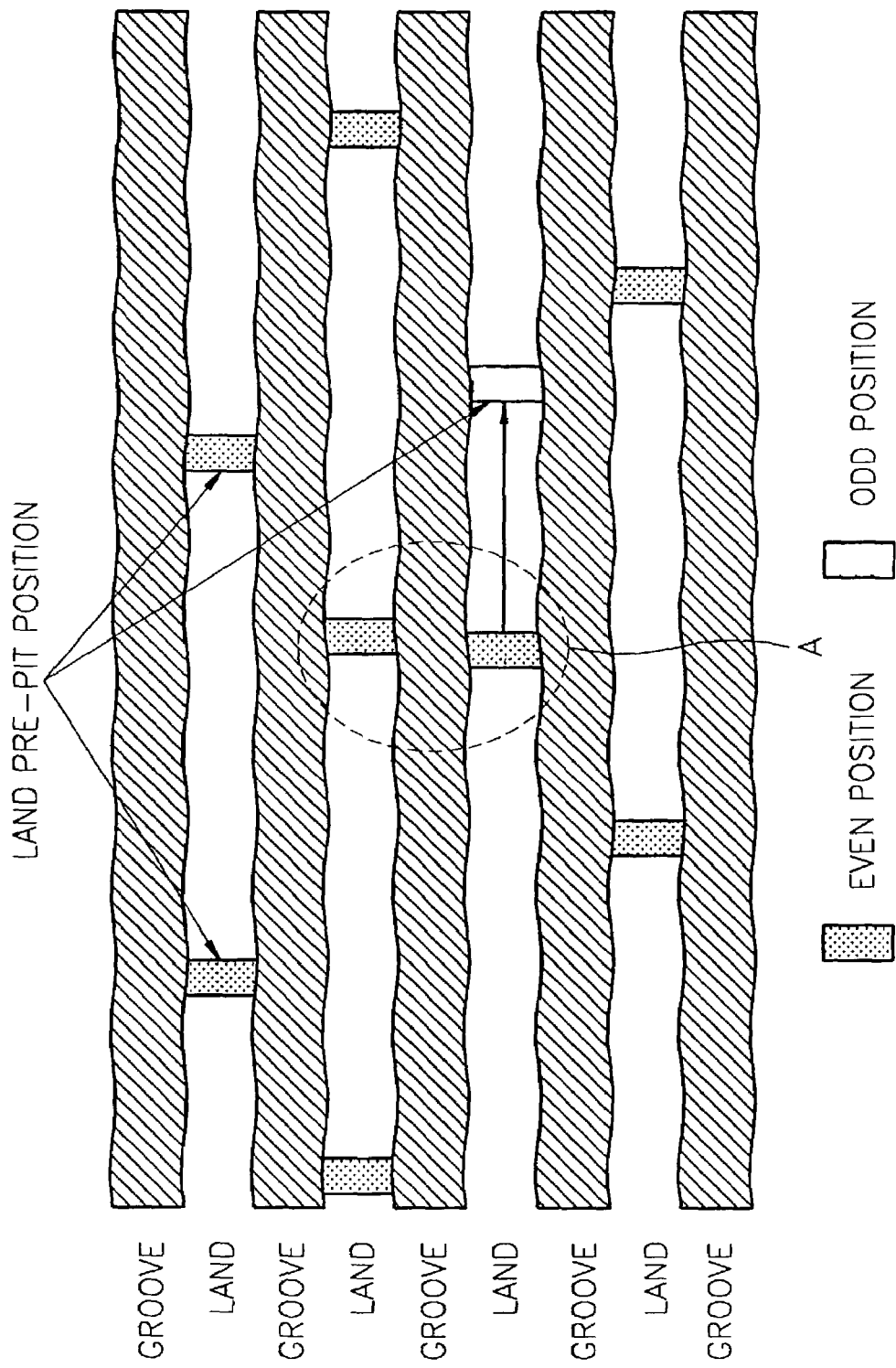

FIGS. 3 through 5 are reference views illustrating a method of recording LPP data.

Referring to FIGS. 3 and 4, one error correction code (ECC) block is formed of 16 sectors and one sector includes 26 frames. In addition, one frame includes eight periods of the wobble signals. If one period of a wobble signal is referred to as one wobble, LPP data is recorded corresponding to the first three wobbles of the 16 wobbles in every two frames.

Referring to FIG. 3, even positions and odd positions are alternately arranged on land tracks for each frame in order to record LPP data. Generally, the LPP data is recorded on the even positions which are located at a period of two frames. However, when the LPP data has been recorded on an adjacent even position of a neighboring land track as shown in A of FIG. 5, the LPP data is not recorded on a corresponding even position, but recorded on an odd frame after shifting one frame in order to prevent crosstalk in a detection process.

In an embodiment of the present invention, LPP data recorded in one sector is formed of synch codes and address data. Here, the address data includes a physical address and disc information, i.e., information for reporting the size and standard of the disc. According to a DVD-RW specification, a synch code is recorded as 111 for an even position and 110 for an odd position. In the case of address data, 101 is referred to as 1 and 100 is referred to as 0.

Figure 6:
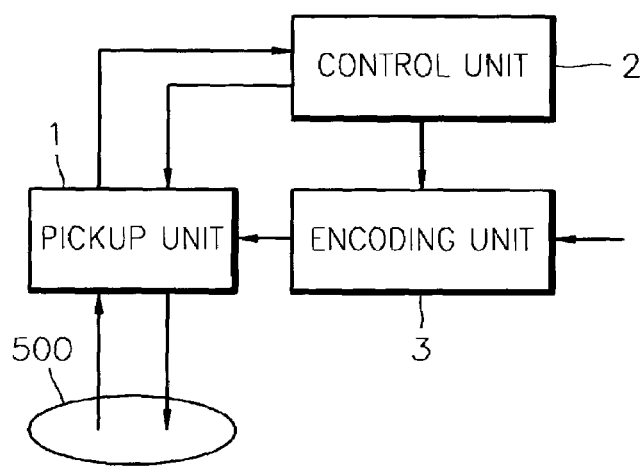
FIG. 6 is a schematic view illustrating an apparatus according to the present invention.

FIG. 6 is a schematic view illustrating an apparatus according to the present invention.

Referring to FIG. 6, a recording apparatus, as an apparatus for recording user data in a desired position based on LPP data recorded on a disc 500, includes a pickup unit 1, a control unit 2, and an encoding unit 3. The pickup unit 1 radiates a laser beam to a disc 500 and receives a reflected laser beam from the disc 500 in order to detect an LPP signal having wobble signals and LPP signals including LPP data from the disc 500.

The control unit 2 processes the wobble signals and the LPP signals supplied from the pickup unit 1 to decode the LPP data, i.e., address information. The control unit 2 outputs a control signal, required to record the user data, to the pickup unit 1 and/or the encoding unit 3 based on the decoded address information so that the encoding unit 3 encodes the user data. The pickup unit 1 records the encoded user data on groove tracks of the disc 500 according to the control signal of the control unit 2.

Figure 7:
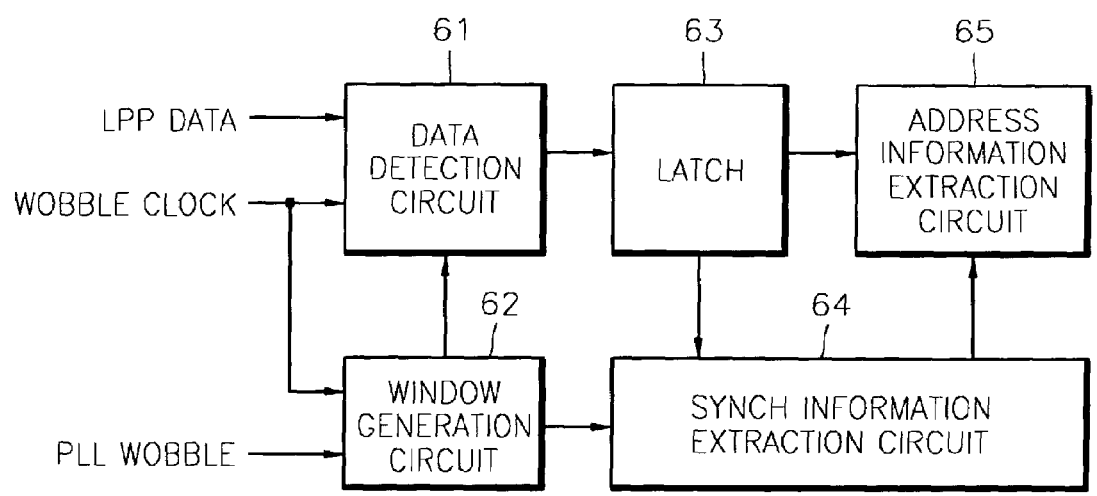
FIG. 7 is a block diagram illustrating a portion of a control unit according to the present invention.

FIG. 7 is a block diagram illustrating a portion of the control unit 2 according to the present invention.

Referring to FIG. 7, the control unit 2 detects synchs in every sector to determine whether LPP data is recorded on an even position or an odd position and detects LPP data from a corresponding position so as to extract address information. More specifically, the control unit 2 includes a data detection circuit 61, a window generation circuit 62, a latch 63, a synch information extraction circuit 64, and an address information extraction circuit 65.

Figure 8:
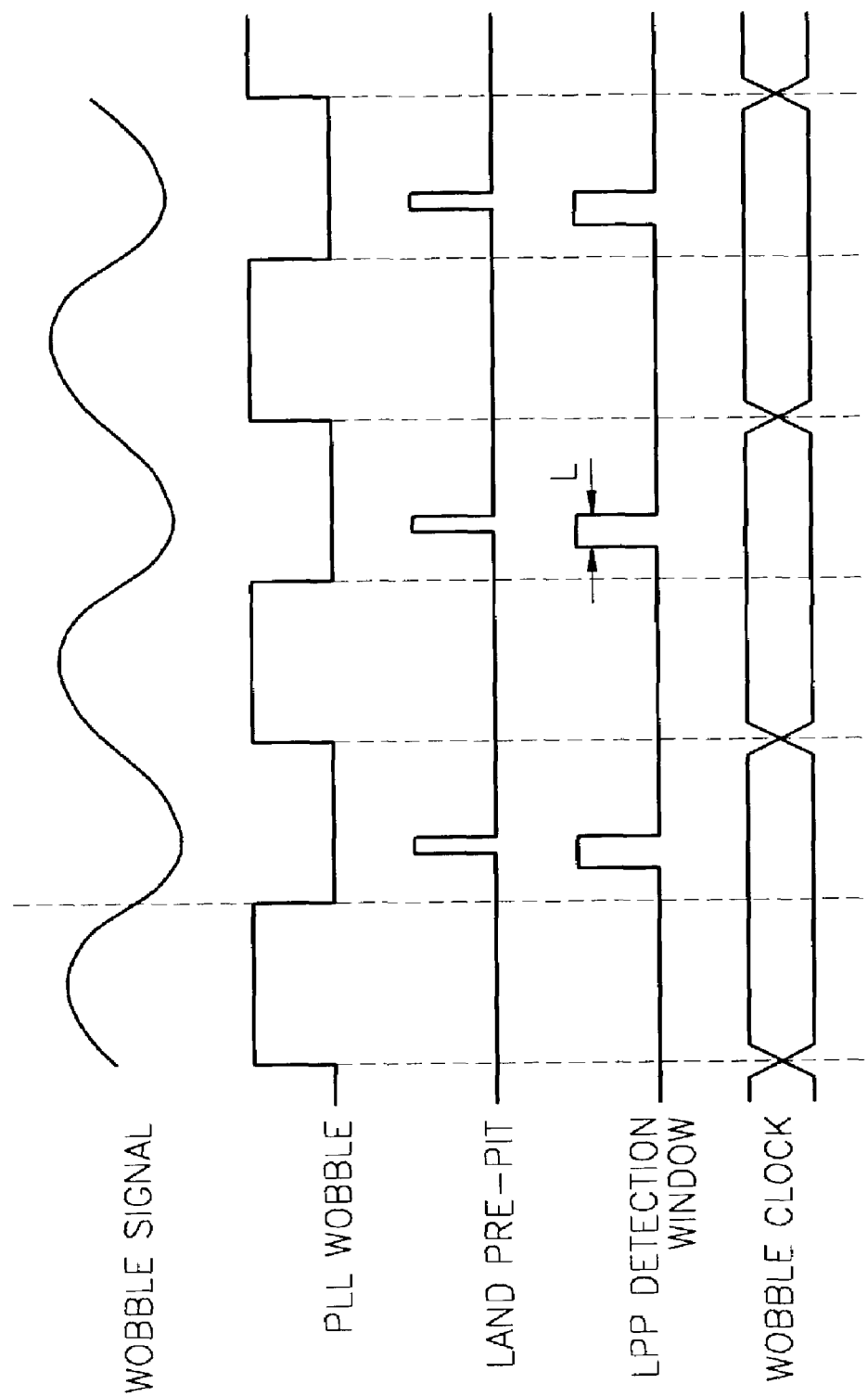
FIG. 8 is a reference view illustrating recordable optical disc signals.

The window generation circuit 62 receives phase locked loop (PLL) wobbles and wobble clocks as presented in FIG. 8, and counts the wobble clocks by a 186 counter at a period of one PLL wobble to generate an LPP detection window. An LPP detection window denotes a predetermined signal reporting the time or position for detecting LPP data as shown in FIG. 8. Here, the size L of the window can be controlled. A wobble signal recorded on a disc 500, which passes through a PLL circuit (not shown) in order to be changed into a binary signal, is referred to as a PLL wobble. A wobble clock is a reference clock signal for generating an LPP detection window, and 186 periods of the wobble clock correspond to one period of the PLL wobble.

Referring to FIG. 7 again, the data detection circuit 61 detects the LPP data at a time or position, i.e., a window, which is denoted by the LPP detection window supplied from the window generation circuit 62. The latch 63 latches the LPP data detected by the data detection circuit 61. The synch information extraction circuit 64 extracts synch information and supplies it to the address information extraction circuit 65. Here, the synch information, required to extract address information from LPP data, includes timing information reporting a time for referring to specific latched LPP data. The address information extraction circuit 65 reads the latched LPP data and decodes the address information with reference to the synch information.

The number of bits latched by the latch 63 according to the present invention is larger than the number of bits allotted to synch code and/or address data. Since three bits are allotted to each of the synch code and the address data recorded on the disc 500 in an embodiment of the present invention, the latch 63 latches more than four bits. When more than four bits are latched for the synch code and/or the address data, the synch information and the address information can be efficiently extracted. For example, the synch code and the address data are allotted as shown in Table 1 and the latch 63 latches six bits.

TABLE 1

|  | b2 | b1 | b0 |
|---|---|---|---|
| even position | 1 | 1 | 1 |
| odd position | 1 | 1 | 0 |
| 1 | 1 | 0 | 1 |
| 0 | 1 | 0 | 0 |

Then, the synch information extraction circuit 64 examines the latched six in Table 2.

TABLE 2

| six bits to be examined | | | | | | examination result |
|---|---|---|---|---|---|---|
| 0 | 0 | 1 | 1 | 1 | 0 | sync code for even position |
| 0 | 0 | 1 | 1 | 0 | 0 | sync code for odd position |

In the case where six bits are examined to detect a synch code, if 011110 is detected, as presented in Table 3, impossibility of detection is directly reported. Accordingly, the detection process of a synch code can be repeated to detect a correct synch code. In the case where only three bits are examined to detect a synch code, and if 011110 is detected, an error of reporting that a synch code exists occurs because 111 is included in 011110. In other words, the case where six bits are examined requires less time to recognize an error in detection than the case where only three bits are examined due to recognizing an error at the same time as performing examination and repeating the synch detection process without trial and error. Accordingly, the examination of six bits reduces a period for detecting the synch code and the generation of errors in the detection process.

TABLE 3

| detected six bits | | | | | | examination result |
|---|---|---|---|---|---|---|
| 0 | 1 | 1 | 1 | 1 | 0 | impossibility of detection |

Meanwhile, the address information extraction circuit 65 examines the latched six bits according to Table 4.

TABLE 4

| detected six bits | | | | | | examination result |
|---|---|---|---|---|---|---|
| 0 | 0 | 1 | 0 | 1 | 0 | data 1 |
| 0 | 0 | 1 | 0 | 0 | 0 | data 0 |

In the same manner, when six bits are examined to detect data, if 011010 is detected, impossibility of detection is directly reported in order to repeat the data detection process. However, when only three bits are examined to detect data, if 011010 is detected, the data is erroneously detected as 1 due to the bits of 101. As a result, the case of detecting six bits reduces the detecting errors more than the case of detecting three bits.

Figure 9:
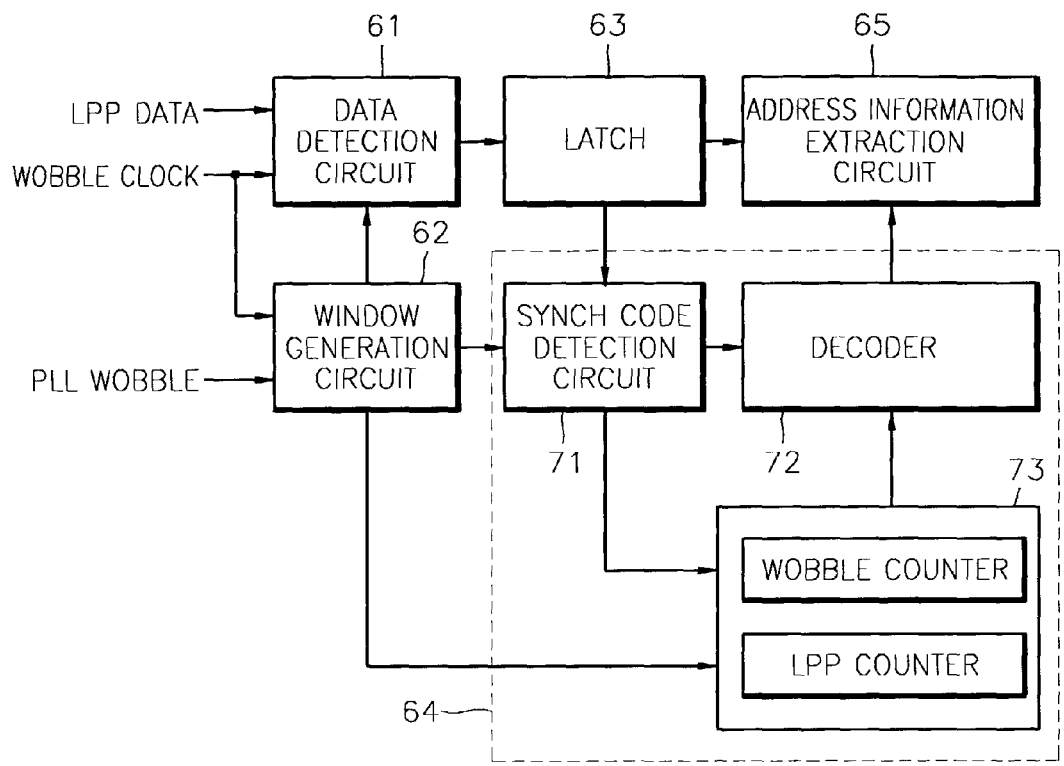
FIG. 9 is a block diagram illustrating a portion of a control unit of FIG. 7 according to a first embodiment of the present invention.

FIG. 9 is a block diagram illustrating a portion of the control unit 2 of FIG. 7 according to a first embodiment of the present invention.

Referring to FIG. 9, the synch information extraction circuit 64 includes a synch code detection circuit 71, a decoder 72, and a counter 73.

Figure 10:
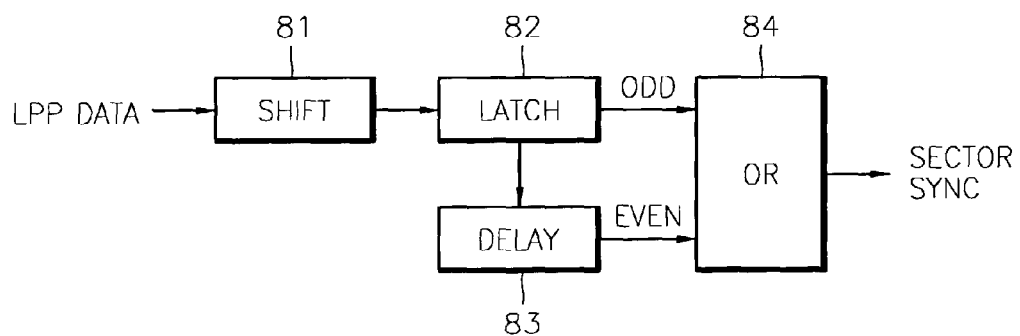
FIG. 10 is a detailed block diagram illustrating a synch code detection circuit.

The synch code detection circuit 71 examines synch codes stored in the latch 63, at every sector to determine whether the synch code is an odd synch or an even synch. Here, the even synch denotes that LPP data is recorded on an even position in the corresponding sector. In the same manner, the odd synch denotes that LPP data is recorded on an odd position in the corresponding sector. More specifically, referring to FIG. 10, the LPP data detected by the data detection circuit 61 are sequentially stored in the latch 63. As described above, since the LPP data formed of synch codes and address data are sequentially recorded in one sector, a shift circuit 81 in the latch 63 shifts the LPP data by one bit. In addition, when predetermined bits, i.e., six bits in the preferred embodiment, are shifted, a latch circuit 82 receives and stores the predetermined bits at once. The synch code detection circuit 71 includes a delay circuit 83 and an OR circuit 84. The delay circuit 83 receives data from the latch circuit at even position/odd position based on a PLL wobble and delays the data with a period of eight wobbles, i.e., one frame. The OR circuit receives data from the delay circuit 83, and receives data from the latch circuit 82 at first odd positions/even positions of every sector to examine whether a synch code exists and outputs the examination result. In other words, the OR circuit 84 outputs a result reporting the position on which LPP data is recorded in the corresponding sector, i.e., an even position/odd position, to the decoder 72 and the counter 73. Referring to FIG. 10, since the synch code is recorded on one of the first even position and the first odd position in every sector, the synch code detection circuit 71 delays data detected in the even position by eight wobbles and compares the data detected in the even position with the data detected in the odd position. Accordingly, the synch code detection circuit 71 may examine the position of the synch code, i.e., the even position/odd position, at once.

Figure 11:
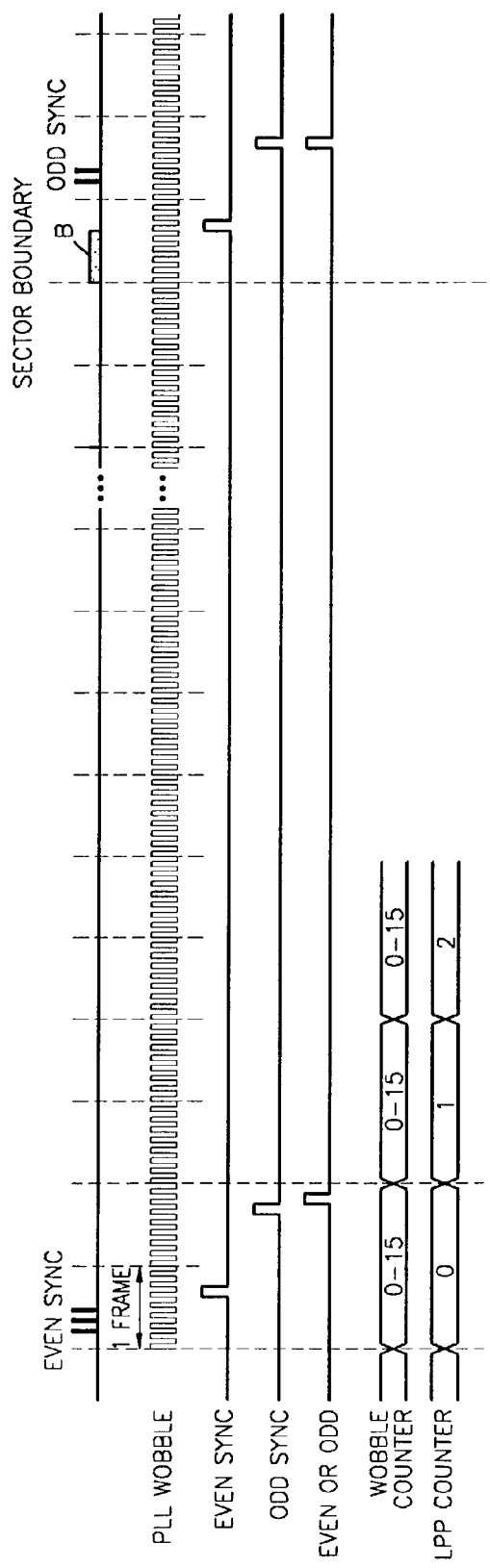
FIG. 11 is a reference view illustrating recordable optical disc signals.

Referring to FIG. 9 again, the counter 73 includes a wobble counter and an LPP counter for reporting the start/end of a frame and the start/end of a sector to the decoder 72. Here, the wobble counter counts wobbles at a period of two frames. In other words, the wobble counter is increased by one according to each wobble. The LPP counter counts LPP data at a period of one sector. In other words, the LPP counter is increased by one according to every two frames, i.e., the even position and the odd position where the LPP data may be recorded. When the synch code detection circuit 71 detects an even position, both the wobble counter and the LPP counter are reset to zero. When the synch code detection circuit 71 detects an odd position, the wobble counter and the LPP counter are reset to eight and zero, respectively. Accordingly, the counter 73 may be used for both cases where the LPP data is recorded on the even position and the odd position. In addition, the start and the end of one sector can be precisely detected in order to prevent an error in detecting a synch code. FIG. 11 is a timing diagram of the wobble counter and the LPP counter corresponding to the PLL wobbles.

Referring to FIG. 9 again, the decoder 72 supplies synch information to the address information extraction circuit 65 based on the results from the synch code detection circuit 71 and the information from the counter 73. Then, the address information extraction circuit 65 takes the LPP data from the latch 63 at a predetermined time to extract address information from the LPP data. Synch information includes timing information reporting the time for the address information extraction circuit 65 to take the LPP data from the latch 63.

Figure 12:
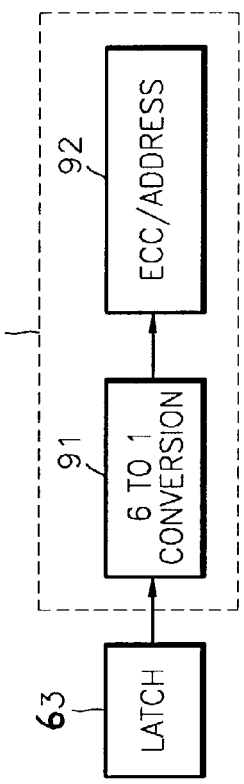
FIG. 12 is a block diagram illustrating an address information extraction circuit of FIG. 9 according to an embodiment of the present invention.

FIG. 12 is a block diagram illustrating the address information extraction circuit 65 of FIG. 9 according to an embodiment of the present invention.

Referring to FIG. 12, the address information extraction circuit 65 includes a conversion circuit 91 and an ECC/address extraction circuit 92. The conversion circuit 91 converts six bits of LPP data, which is taken from the latch 63, into one bit with reference to Table 1. The ECC/address circuit 92 corrects error of the converted LPP data by a predetermined method and extracts a physical address and/or disc information from the error corrected converted LLP data.

Figure 13:
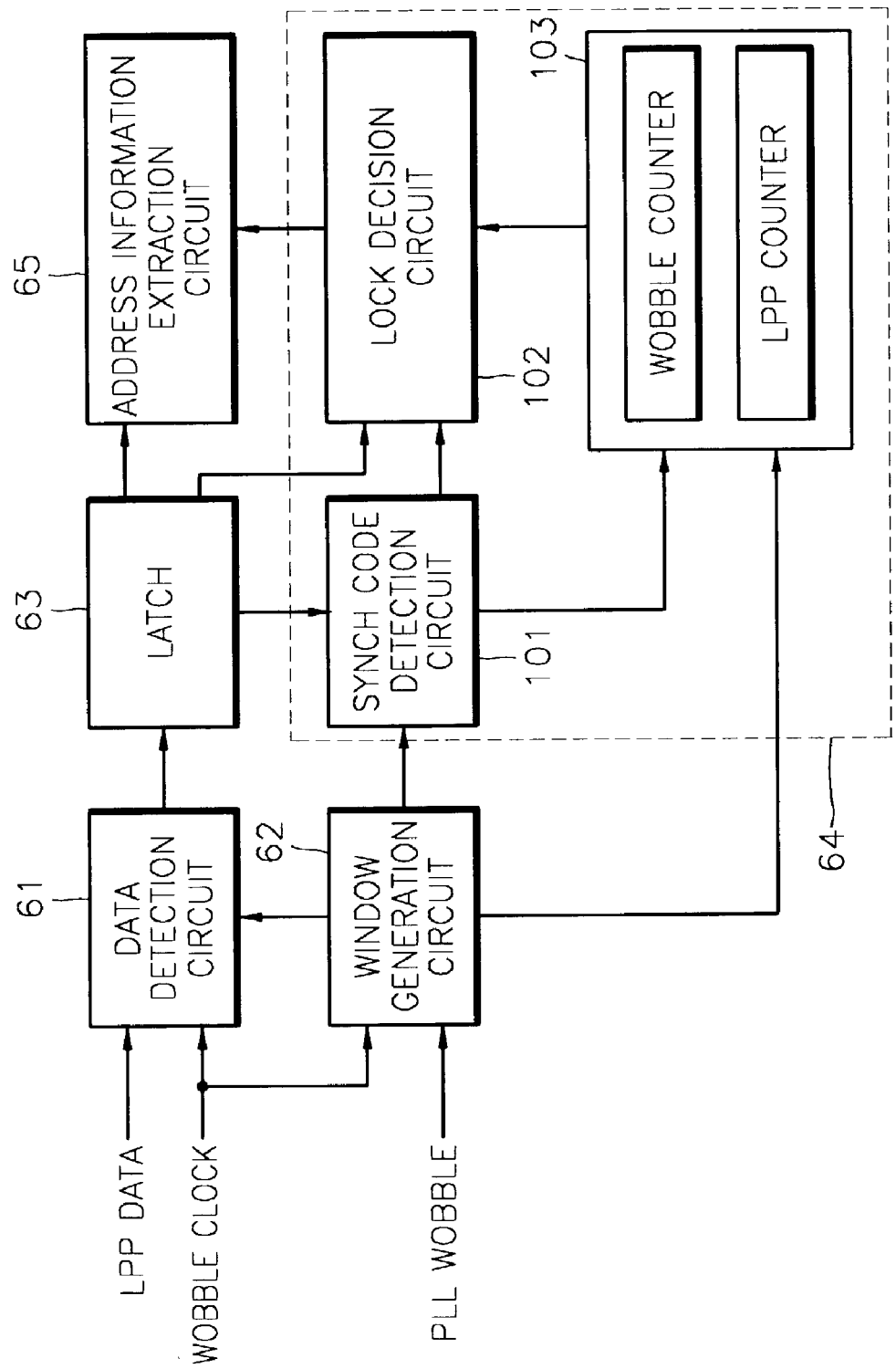
FIG. 13 is a block diagram illustrating a portion of a control unit of FIG. 7 according to a second embodiment of the present invention.

FIG. 13 is a block diagram illustrating a portion of the control unit of FIG. 7 according to a second embodiment of the present invention.

Referring to FIG. 13, the synch information extraction circuit 64 includes a synch code detection circuit 101, a lock decision circuit 102, and a counter 103.

The synch code detection circuit 101 examines synch codes stored in a latch 63 at every sector to determine whether the synch code is an odd synch or an even synch. Here, the even synch denotes that LPP data is recorded on an even position in the corresponding sector. In the same manner, the odd synch denotes that LPP data is recorded on an odd position in the corresponding sector. More specifically, referring to FIG. 10, the LPP data detected by a data detection circuit 61 are sequentially stored in the latch 63. As described above, since the LPP data formed of synch codes and address data are sequentially recorded in one sector, a shift circuit 81 in the latch 63 shifts the LPP data by one bit. In addition, when predetermined bits, i.e., six bits in the preferred embodiment, are shifted, a latch circuit 82 receives and stores the predetermined bits at once. The synch code detection circuit 71 includes a delay circuit 83 and an OR circuit 84. The delay circuit 83 receives data from the latch circuit at even position/odd position based on a PLL wobble and delays the data to a period of eight wobbles, i.e., one frame. The OR circuit 84 receives data from the delay circuit 83 and receives data from the latch circuit 82 at first odd positions/even positions of every sector to examine whether a synch code exists and output the examination result. In other words, the OR circuit 84 outputs a result reporting the position on which LPP data is recorded in a corresponding sector, i.e., an even position/odd position, to the lock decision circuit 102 and the counter 103. Referring to FIG. 11, since a synch code is recorded on one of the first even position and the first odd position in every sector, the synch code detection circuit 101 delays data detected in the even position by eight wobbles and compares the data detected in the even position with the data detected in the odd position. Accordingly, the synch code detection circuit 101 may examine the position of the synch code, i.e., the even position/odd position, at once. However, when a position lock is decided by the lock decision circuit 102 as will be described later, the synch code is detected at the first even/odd position of every sector.

Referring to FIG. 13 again, the counter 103 includes a wobble counter and an LPP counter to send timing information reporting the start/end of a frame and the start/end of a sector to the lock decision circuit 102. Here, the wobble counter counts wobbles at a period of two frames. In other words, the wobble counter is increased by one for each wobble. The LPP counter counts LPP data at a period of one sector. In other words, the LPP counter is increased by one for every two frames, i.e., the even position and the odd position where the LPP data may be recorded. When the synch code detection circuit 101 detects an even position, both the wobble counter and the LPP counter are reset to zero. When the synch code detection circuit 101 detects an odd position, the wobble counter and the LPP counter are reset to eight and zero, respectively. Accordingly, the counter 103 may be used for both cases where the LPP data is recorded on the even position and the odd position. In addition, the start and the end of one sector can be precisely detected in order to prevent an error in detecting a synch code. Again, FIG. 11 is a timing diagram of the wobble counter and the LPP counter corresponding to the PLL wobbles.

Referring to FIG. 13 again, the lock decision circuit 102 receives a result from the synch code detection circuit 101 and takes the data latched according to the timing information of the counter 103 to determine whether conditions for generating lock decision information is satisfied. Based on the determination result, the lock decision circuit 102 decides the establishment of lock decision information, i.e., position lock/unlock and sector lock/unlock, and sends the decision result to the address information extraction circuit 65 and/or a window generation circuit 62. More specifically, if data are continuously detected in an LPP detection window for more than an established value, i.e., two to four times in the preferred embodiment, after a synch code is detected, a position lock is established. When the position lock is established, the window generation circuit 62 decides that the LPP detection window is correctly established. Accordingly, the synch code detection circuit 101 detects a synch code when the value of a frame counter is zero. In addition, the address information extraction circuit 65 regards data detected outside the LPP detection window as errors and eliminates the data. If data is not continuously detected in an LPP detection window for more than an established value, i.e., two to four times in the preferred embodiment, a position unlock is established. When the position unlock is established, the window generation circuit 62 decides that the LPP detection window is not correctly established. Accordingly, the window generation circuit 62 generates an LPP detection window at a period of two frames. If a sector synch is continuously detected in a window for more than an established value, i.e., twice in the preferred embodiment, a sector lock is established. When the sector lock is established, the synch codes detected from the positions other than a position presumed to have a synch code are regarded as address data. Accordingly, even if a synch code is not detected from a position presumed to have a synch code, i.e., first even/odd positions of every sector, the synch code detection circuit 101 decides that the synch code is detected. In other words, the synch code detection circuit 101 generates a pseudo-synch code. If a synch code is not continuously detected in a window for more than an established value, i.e., two, four, or eight times in the preferred embodiment, a sector unlock is established. The lock decision circuit 102 supplies synch information to the address information extraction circuit 65 and/or the window generation circuit 62 based on the result from the synch code detection circuit 101, the timing information from the counter 103, and the LPP data from the latch 63. In the preferred embodiment, synch information includes timing information reporting a time for the address information extraction circuit 65 to take LPP data from the latch 63, lock decision information, and information demanding the generation of an LPP detection window to the window generation circuit 62.

The address information extraction circuit 65 takes the LPP data from the latch 63 at a predetermined time to extract the address information. Here, in detecting the LLP data, the address information extraction circuit 65 varies an error margin according to the lock decision information. In other words, when the sector unlock is established, six bits established as presented in Table 5 are examined to detect address data. However, when the sector lock is established, the address data is detected while considering a bit error margin. For example, based on Table 5, 001010 has to be detected for 1, and an error is recognized for other cases. However, if the bit error margin is considered, 001011, which is only one bit different from 001010, is regarded as 1. Here, the condition for deciding the bit error margin can be determined through experiments.

TABLE 5

|  | b5 | b4 | b3 | b2 | b1 | b0 |
|---|---|---|---|---|---|---|
| even position | 0 | 0 | 1 | 1 | 1 | 0 |
| odd position | 0 | 0 | 1 | 1 | 0 | 0 |
| 1 | 0 | 0 | 1 | 0 | 1 | 0 |
| 0 | 0 | 0 | 1 | 0 | 0 | 0 |

Methods for detecting address information according to preferred embodiments of the present invention will now be described with reference to the above-described constitution.

Figure 14:
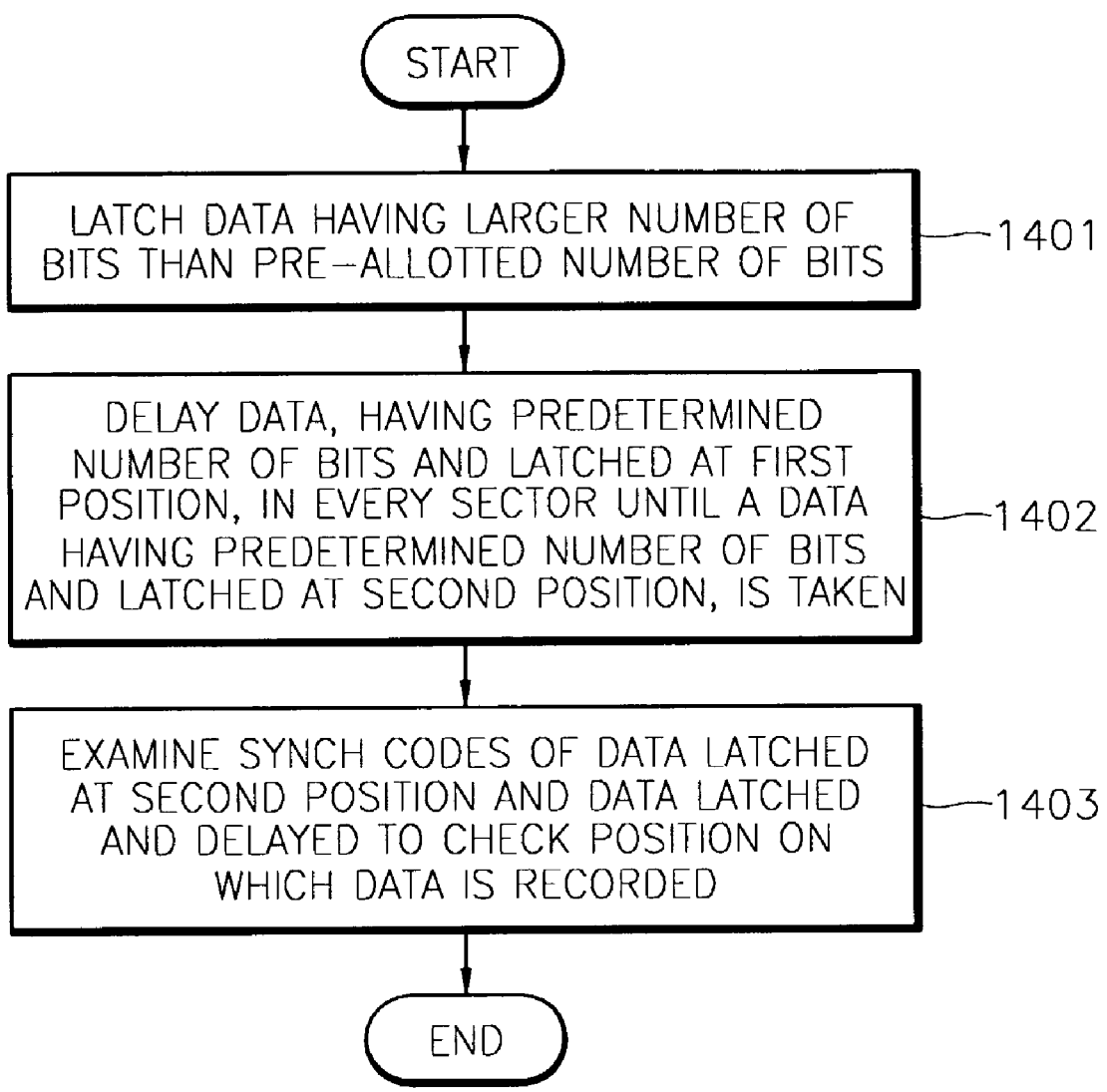

FIG. 14 is a flowchart for explaining a method for detecting address information according to a first embodiment of the present invention.

Referring to FIG. 14, a recording apparatus detects address information from an optical disc where a plurality of sectors are arranged and address information is recorded on each sector on pre-pits. In order to detect the address information, a sector synch has to be detected first. Accordingly, data having a larger number of bits than the number of pre-allotted bits is latched in step 1401. Thereafter, data at first positions of every sector, having a predetermined number of bits, which are latched, are delayed until data at second positions of every sector, having a predetermined number of bits, which are latched, are received in step 1402. Next, the synch codes of the latched data from the second positions and the synch codes of the data latched in step 1401 and delayed in step 1402 are examined to determine whether the address data are recorded on even positions or odd positions in step 1403.

Figure 15:
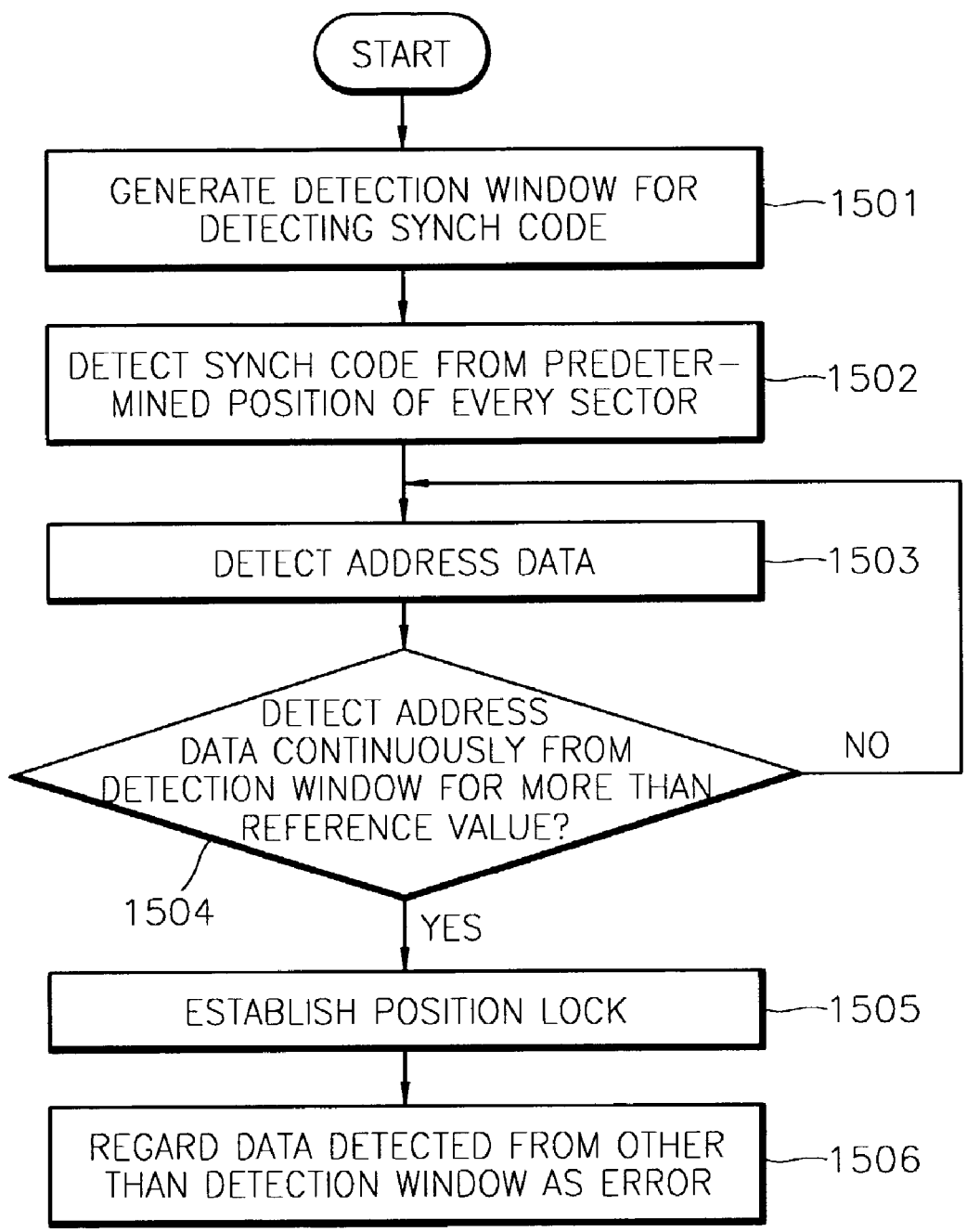

FIG. 15 is a flowchart for explaining a method for detecting address information according to a second embodiment of the present invention.

Referring to FIG. 15, a recording apparatus generates a detection window for detecting a synch code in step 1501 and detects synch codes from predetermined positions of every sector in step 1502. Thereafter, address data are detected in step 1503. After the synch codes are detected, if the address data are continuously detected from the detection window for more than a reference value in step 1504, a position lock is established in step 1505. When the position lock is established, data detected outside the detection window are regarded as errors in step 1506.

Figure 16:
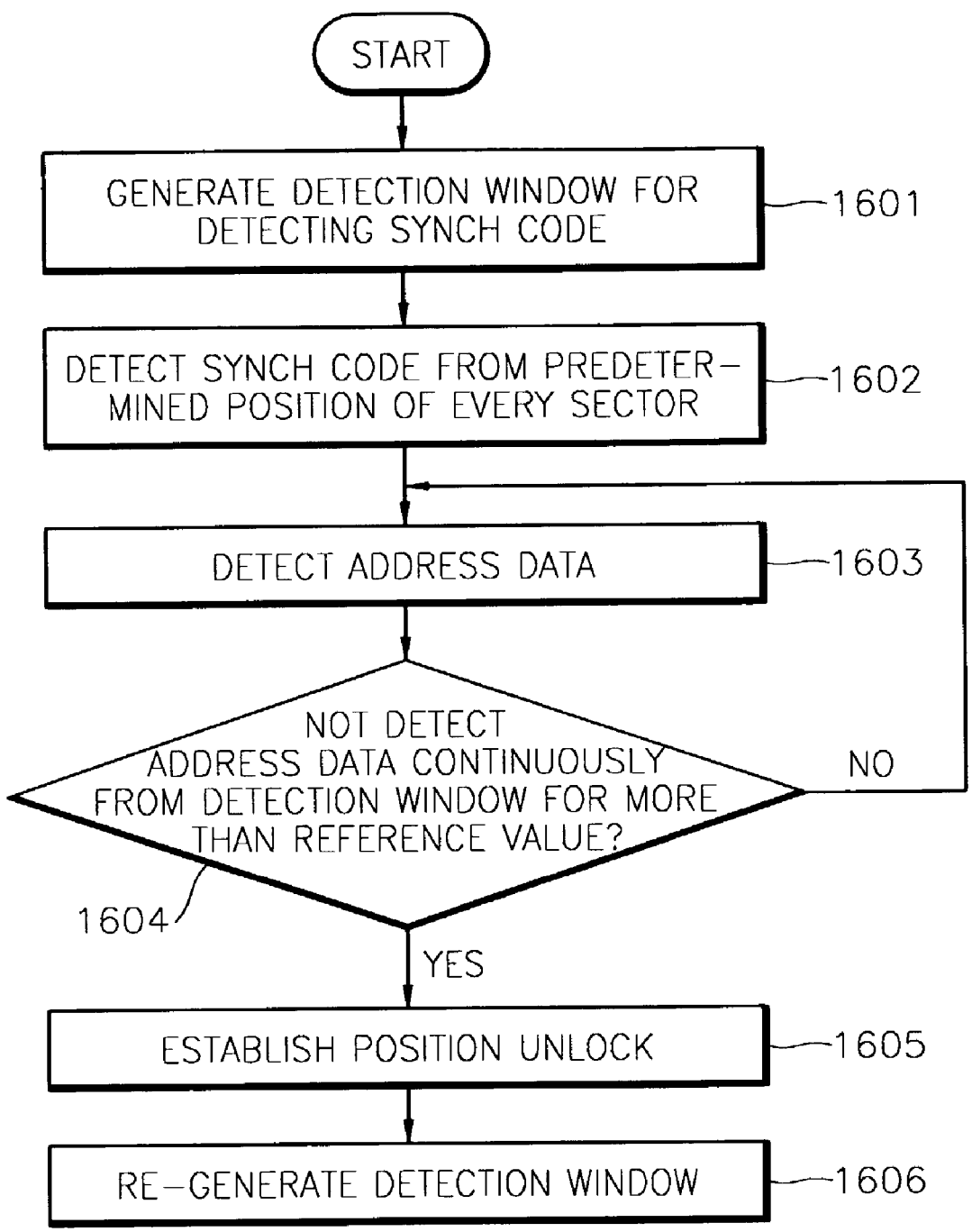

FIG. 16 is a flowchart for explaining a method for detecting address information according to a third embodiment of the present invention.

Referring to FIG. 16, a recording apparatus generates a detection window for detecting a synch code in step 1601 and detects synch codes from predetermined positions of every sector in step 1602. Thereafter, address data are detected in step 1603. After the synch codes are detected, if the address data are not continuously detected from the detection window for more than a reference value in step 1604, a position unlock is established in step 1605 and a detection window is re-established in step 1606.

FIG. 17 is a flowchart for explaining a method for detecting address information according to a fourth embodiment of the present invention.

Referring to FIG. 17, a recording apparatus generates a detection window for detecting a synch code in step 1701 and detects synch codes from predetermined positions of every sector in step 1702. Thereafter, address data are detected in step 1703. If the synch codes are detected for more than a reference value without errors in step 1704, a sector lock is established in step 1705. When the sector lock is established, data detected outside the locations presumed to have synch codes are regarded as address data in step 1706.

According to a method and an apparatus for detecting address information according to the present invention, address information recorded on an optical recording medium by LPP can be efficiently detected. In addition, a synch code can be efficiently detected in detecting the address information recorded by LPP.

What is claimed is:

1. An apparatus for detecting address information from an optical disc on which a plurality of sectors are arranged and pre-pit data are recorded on each sector, the apparatus comprising:

a window generation circuit for generating a detection window for detecting the pre-pit data;

a data detection circuit for detecting the pre-pit data based on the generated detection window;

a latch for latching a first data detected by the data detection circuit to a larger number of bits than a pre-allotted number of bits;

a synch information extraction circuit for generating synch information informing a time to refer to the latched data; and an address information extraction circuit for detecting address information by reading the latched data based on the generated synch information.

2. The apparatus of claim 1, wherein the window generation circuit generates the detection window by counting wobble clocks at a period of phase locked loop (PLL) wobbles, which are obtained by binarizing wobble signals recorded on the optical disc.

3. The apparatus of claim 2, wherein the data detection circuit detects the pre-pit data at a time or position set by the detection window.

4. The apparatus of claim 3, wherein the pre-pit data are land pre-pit (LPP) data recorded on land tracks, the LPP data are formed of synch codes and address data, and the latch latches the first data including the LPP data to a larger number of bits than the number of bits allotted in the synch codes.

5. The apparatus of claim 4, wherein the synch information extraction circuit includes a synch code detection circuit for delaying data at a first position of every sector, having a predetermined number of bits and being latched in the latch, until data at a second position of every sector, having a predetermined number of bits and being latched in the latch, is taken to examine synch codes of the latched data from the first and second positions, thereby checking the position where the LPP data is recorded.

6. The apparatus of claim 5, wherein the synch information extraction circuit includes:

a counter for reporting a start and an end of a frame and a start and an end of the sector according to the position checked by the synch code detection circuit; and a decoder for supplying synch information that reports a time for the address information extraction circuit to take the LPP data from the latch, based on information supplied from the counter.

7. The apparatus of claim 6, wherein the counter includes:

a wobble counter for counting PLL wobbles during periods of two frames, increased by one for every one PLL wobble; and an LPP counter for counting two frames during periods of a sector, increased by one for every two frames.

8. The apparatus of claim 7, wherein the wobble counter and the LPP counter are reset to zero when the synch code detection circuit detects an even position, and the wobble counter and the LPP counter are reset to a medium value and zero, respectively, when the synch code detection circuit detects an odd position.

9. The apparatus of claim 4, wherein the address information extraction circuit includes a conversion circuit for converting data having a specific number of bits, which is taken from the latch, into second data having a predetermined number of bits.

10. A method for detecting address information from an optical disc on which a plurality of sectors are arranged and the address information is recorded on pre-pits on each sector, the method comprising:

(a) latching data having a larger number of bits than a pre-allotted number of bits; and (b) examining the latched data in every sector to detect synch codes.

11. The method of claim 10, wherein (b) includes:

(b1) delaying data at a first position in every sector, having a predetermined number of bits and being latched in the latch, until data at a second position in every sector, having a predetermined number of bits and being latched in the latch, is taken; and (b2) examining the synch code of the latched data from the second position and the synch code of the latched data from the first position to check a position on which address data is recorded.

* * * * *